US009619796B2

(12) United States Patent
Andriani et al.

(10) Patent No.: US 9,619,796 B2
(45) Date of Patent: Apr. 11, 2017

(54) ENABLING CARD AND METHOD AND SYSTEM USING THE ENABLING CARD IN A P.O.S

(71) Applicant: DASHPASS INC., Toronto (CA)

(72) Inventors: Alessandro Andriani, Richmond Hill (CA); Leonardo Covello, King City (CA); Mario Crudo, Aurora (CA); Bruce Silcoff, Thornhill (CA); Jonathan Silver, Toronto (CA)

(73) Assignee: DASHPASS INC., Concord (CA)

( * ) Notice: Subject to any disclaimer, the term of this patent is extended or adjusted under 35 U.S.C. 154(b) by 0 days.

(21) Appl. No.: 14/489,006

(22) Filed: Sep. 17, 2014

(65) Prior Publication Data

US 2016/0078429 A1 Mar. 17, 2016

(51) Int. Cl.
*G06K 5/00* (2006.01)
*G06Q 20/34* (2012.01)
*G06K 19/06* (2006.01)
*G06Q 20/40* (2012.01)
*G06Q 20/20* (2012.01)
*G06Q 20/32* (2012.01)

(52) U.S. Cl.
CPC ....... *G06Q 20/34* (2013.01); *G06K 19/06206* (2013.01); *G06Q 20/20* (2013.01); *G06Q 20/204* (2013.01); *G06Q 20/322* (2013.01); *G06Q 20/327* (2013.01); *G06Q 20/3227* (2013.01); *G06Q 20/3278* (2013.01); *G06Q 20/352* (2013.01); *G06Q 20/353* (2013.01); *G06Q 20/354* (2013.01); *G06Q 20/40* (2013.01)

(58) Field of Classification Search
CPC ............... G06Q 20/382; G06Q 20/322; G06Q 20/3226; G06Q 20/3278; G06Q 20/204; G06Q 20/34; G06K 19/06206
USPC ................. 235/375, 380, 492, 493
See application file for complete search history.

(56) References Cited

U.S. PATENT DOCUMENTS

| | | | | |
|---|---|---|---|---|
| 5,585,787 | A * | 12/1996 | Wallerstein | ........ G06Q 20/3415 235/380 |
| 6,250,557 | B1 * | 6/2001 | Forslund | ............ G06K 17/0022 235/375 |
| 7,828,214 | B2 | 11/2010 | Narendra et al. | |
| 8,313,037 | B1 * | 11/2012 | Humphrey | ....... G06K 19/06206 235/379 |

(Continued)

FOREIGN PATENT DOCUMENTS

WO          96/26500          8/1996

OTHER PUBLICATIONS

International Search Report issued in International Application No. PCT/CA2015/000492 (date of mailing Jan. 6, 2016).

(Continued)

*Primary Examiner* — Paultep Savusdiphol
(74) *Attorney, Agent, or Firm* — Eugene J. A. Gierczaig

(57) ABSTRACT

The invention relates to an enabling card as well as a system and method for completing a financial transaction in a P.O.S. terminal comprising: a processor carried by the enabling card for establishing a connection with a mobile device; receiving secure information from a mobile device and generating a digital signal; a coil carried by the enabling card for generating a magnetic field in response to the digital signal to simulate the swipe of card in the P.O.S. terminal and complete the financial transaction.

23 Claims, 7 Drawing Sheets

(56) References Cited

U.S. PATENT DOCUMENTS

| | | | |
|---|---|---|---|
| 8,348,159 B2 | 1/2013 | Bonalle et al. | |
| 8,376,239 B1 | 2/2013 | Humphrey | |
| 8,469,277 B2 | 6/2013 | Johnson, Jr. et al. | |
| 8,528,812 B2* | 9/2013 | Gannon | G06Q 20/20 235/379 |
| 8,584,938 B2 | 11/2013 | Bonalle et al. | |
| 8,645,213 B2 | 2/2014 | Granbery et al. | |
| 8,925,826 B2* | 1/2015 | Liu | G06Q 20/02 235/487 |
| 2002/0043566 A1* | 4/2002 | Goodman | G06Q 20/341 235/492 |
| 2005/0269401 A1* | 12/2005 | Spitzer | G06Q 20/32 235/380 |
| 2007/0276765 A1* | 11/2007 | Hazel | G06F 21/72 705/71 |
| 2009/0159689 A1* | 6/2009 | Mullen | G06K 19/06206 235/487 |
| 2012/0039469 A1* | 2/2012 | Mueller | G06Q 20/12 380/252 |
| 2012/0280035 A1* | 11/2012 | Liu | G06Q 20/02 235/380 |
| 2014/0138447 A1* | 5/2014 | Goldman | G06K 19/06206 235/492 |

OTHER PUBLICATIONS

Written Opinion issued in International Application No. PCT/CA2015/000492 (date of mailing Jan. 6, 2016).

* cited by examiner

ENABLING CARD AND METHOD AND SYSTEM USING THE ENABLING CARD IN A P.O.S

FIELD OF THE INVENTION

This invention relates to a payment device that is compatible with magnetic readers such as existing point of sale terminal P.O.S. that improves the level of transaction security. More particularly this invention relates to an enabling card and the method and system using the enabling card in a reader such as a P.O.S. where the enabling card is capable of gathering information such as a user's credit card information from a mobile device to complete a payment transaction while placed into a regular P.O.S. terminal.

BACKGROUND OF THE INVENTION

A magnetic stripe card is a type of card capable of storing data by modifying the magnetism of tiny iron-based magnetic particles on a band of magnetic material on the card. The magnetic stripe, sometimes called swipe card or magstripe, is read by swiping past a magnetic reading head, such as a P.O.S.

Financial institutions provide a variety of cards, such as credit cards, debit cards and the like. Merchants also provide gift cards or the like. A vast majority of these cards have magnetic stripes and are known as magnetic cards. There are up to three tracks on magnetic cards known as tracks 1, 2, and 3. Track 3 is virtually unused by the major worldwide networks, and often isn't even physically present on the card by virtue of a narrower magnetic stripe. Point-of-sale card readers almost always read track 1, or track 2, and sometimes both, in case one track is unreadable. The minimum cardholder account information needed to complete a transaction is present on both tracks. Track 1 has a higher bit density, and is generally the only track that may contain alphabetic text, and hence is the only track that contains the cardholder's name.

Furthermore many hotels and other institutions including office buildings generate security or access cards in order to allow authorized personal to enter their hotel rooms, institutions or office buildings. There is a general concern to provide only the authorized personal with the security passes.

There have been a variety of prior art devises mid methods to improve the security of the above mentioned cards and particularly financial institution cards. For example security codes or PINs, such as a sequence of 4 numbers for examples can be a required input into a P.O.S. terminal before completing a transaction. However this is not foolproof as security codes can be stolen. Moreover in many cases and in many jurisdictions PINs are not used. Also some cards have chips embedded into the cards or include RFID devices. One chip card technology relates to Europay, Master card, Visa known as EMV.

Other attempts to improve the security of financial transactions are shown in U.S. Pat. No. 8,645,213 which show methods and apparatus, including computer program products, for transactions associated with a mobile device. The method includes, in a merchant device linked to a server by a first network, sending a registration to the server, sending a transaction message to the server, receiving a unique identifier from the server in response to the transaction message, broadcasting the unique identifier, in response to the broadcasted unique identifier, receiving instructions in the server from a mobile application residing in a memory of a mobile device over a second network, processing a transaction in response to the instructions, and notifying the merchant device of the processed transaction.

Furthermore U.S. Pat. No. 8,348,159 shows a wireless financial transaction instrument, such as a card, that has a magnetic stripe, a display, and an on-board power supply, such as a battery, and is usable with a dual capture point of sale terminal. Information is received by such a terminal from the card wirelessly, and also from the magnetic stripe, and the data received contactlessly is preferably used to verify that read from the stripe. The display can display the account number on command, or to display a current balance, or amount of credit remaining, or any combination of these items of information.

Moreover U.S. Pat. No. 8,584,938 illustrate a wireless transaction medium having combined magnetic stripe and radio frequency communications.

Finally U.S. Pat. No. 8,469,277 shows methods, systems, and computer program products for acquiring payment device data for wireless payment transactions. According to one method, a request from a wireless payment reader for standardized payment device data for effecting a wireless payment is received by a wireless smart payment device. Payment device data elements are assembled by the wireless smart payment device into the standardized payment device data. The standardized payment device data are sent by the wireless smart payment device to the wireless payment reader.

It is an object of this invention to provide an improved payment device and method and system to improve the security of payment using magnetic cards or tap and go cards or RFID devices.

SUMMARY OF THE INVENTION

This invention relates to an enabling card for completing a transaction in a reader comprising: a) a processor carried by the enabling card for: i) establishing a connection with a device; ii) receiving secure information from the device and generating a signal; b) structure carried by the enabling card for generating a magnetic field in response to the signal to simulate the swipe of card in the reader This invention relates to an enabling card for completing a transaction in a reader comprising: a processor carried by the enabling card for: establishing a connection with a mobile device; receiving secure information from a the mobile device and generating a digital signal; a coil carried by the enabling card for generating a magnetic field in response to the digital signal is simulate the swipe of card in the reader and complete the financial transaction.

It is another aspect of the invention to provide a system for completing a financial transaction through a P.O.S. terminal comprising: a mobile phone having an app for containing encrypted credit card authorization information; an enabling card comprising: a CPU; a Bluetooth module for establishing a connection with the mobile phone app; and a coil so as to receive the encrypted credit card authorization information; wherein the CPU translates the encrypted credit card authorization information to generate a digital signal which communicates with the coil to generate a magnetic field to simulate the swipe of a regular credit card in the P.O.S. terminal and complete the transaction.

Yet another aspect of this invention relates to a method of completing a financial transaction in a P.O.S. terminal comprising the steps of: inserting an enabling card into the P.O.S. terminal, said enabling card lacking authorization information; establishing a wireless connection between the enabling card and a mobile phone application containing encrypted credit card authorization information; transferring the credit card authorization information from the mobile phone to the enabling card; generating a magnetic field in response to the credit card authorization information transferred the credit card so as to complete the transaction.

These and other objects and features of the invention will be described with reference to the following drawings.

BRIEF DESCRIPTION OF THE DRAWINGS

A detailed description of preferred embodiments is provided herein below by way of example only and with reference to the following drawings, in which.

DETAILED DESCRIPTION OF THE INVENTION

Figure 1:
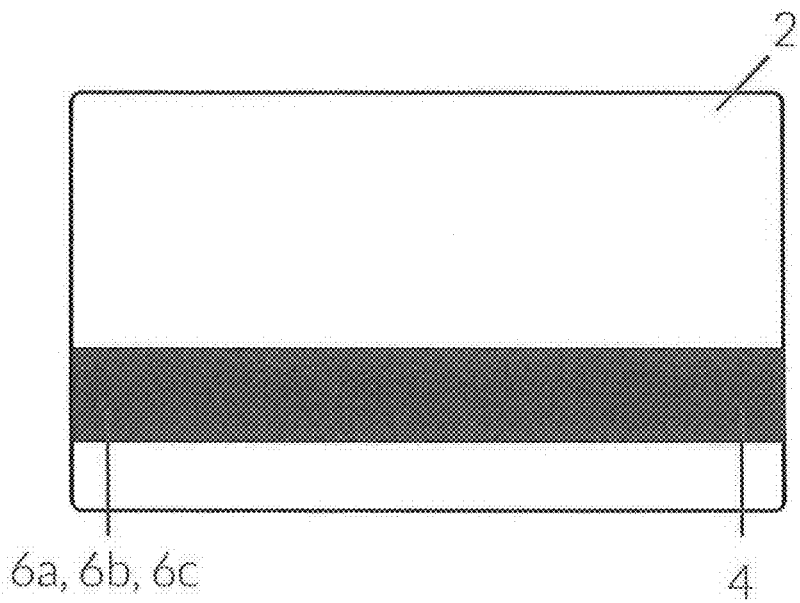
FIG. 1 illustrates a typical financial card having a magnetic stripe.

FIG. 1 illustrates a card 2 such as a credit card, debit card, gift card, hotel door card, security access card or the like. The financial card 2 has a magnetic strip 4 which is comprised of tracks 6. More specifically there can be a plurality of tracks 6a, 6b and/or 6c. As previously described, the tracks 6 contain information in a normal transaction to complete a sale in a P.O.S.

Figure 2:
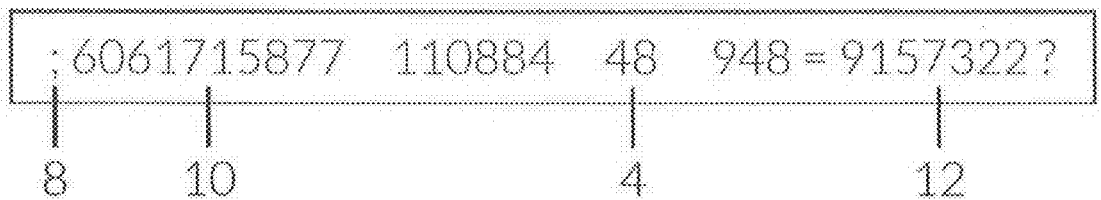
FIG. 2 illustrates an example of a track on a magnetic swipe.

The magnetic strip 4 can by way of example contain the following sequence as shown in FIG. 2. The sequence shown in FIG. 2 starts with colon 8 and includes encrypted information 10 such as the identity of the card holder, credit limit and and/or vendor or financial institution identity 12. A credit card, gift card, hotel door card, or security card or the like also includes encrypted information on the magnetic strip 4 which can include the name of the holder of the card 2 as well as the financial institution, hotel, organization or office which has issued the card 2.

The invention to be described herein comprises in one embodiment moving the encrypted information or authorization 10 that normally resides in a card 2 to a mobile device 24 such as a mobile phone 24, or obtaining a one time encrypted authorization by the mobile phone 24 from a financial institution, vendor, hotel, organization, office or the like. In either case the enabling or authorization card 20 to be described herein gathers the:

encrypted information; or
one time encrypted authorization
from the mobile phone 24 to complete the transaction. The vital information 10, and 12 is resident in the mobile device 24, thus more secure that if the vital information 10 and 12 was resident on the card 2, or enabling card 20.

In the case where the enabling card 20 acts as a financial institution card 2, once the transaction is completed the enabling card 20 loses the encrypted information or one time encrypted authorization—but the encrypted information resides within the mobile phone 24. In other words there is separation of the encrypted information or one time encrypted authorization from the card 2 to the mobile device 24 which communicates with the enabling card 20.

In the case of a hotel door card, organization, or office security card or the like the encrypted information would reside in the mobile phone 24. In other words hotels or vendors could send the encrypted information (which could be time sensitive) ahead of time to the guest or on the spot; making it easier and more secure than heretofore. By time sensitive we mean that the hotel door security card does not work after the guest hotel stay expires.

Thus the invention described herein contemplates the use of one enabling card 20 that can be activated or deactivated by a financial institution, vendor, hotel, organization or office as the need arises; or the use of a plurality of enabling cards 20 that are activated or deactivated by a plurality of financial institutions, vendors, hotels, organizations, offices or the like as the need arises.

Figure 3:
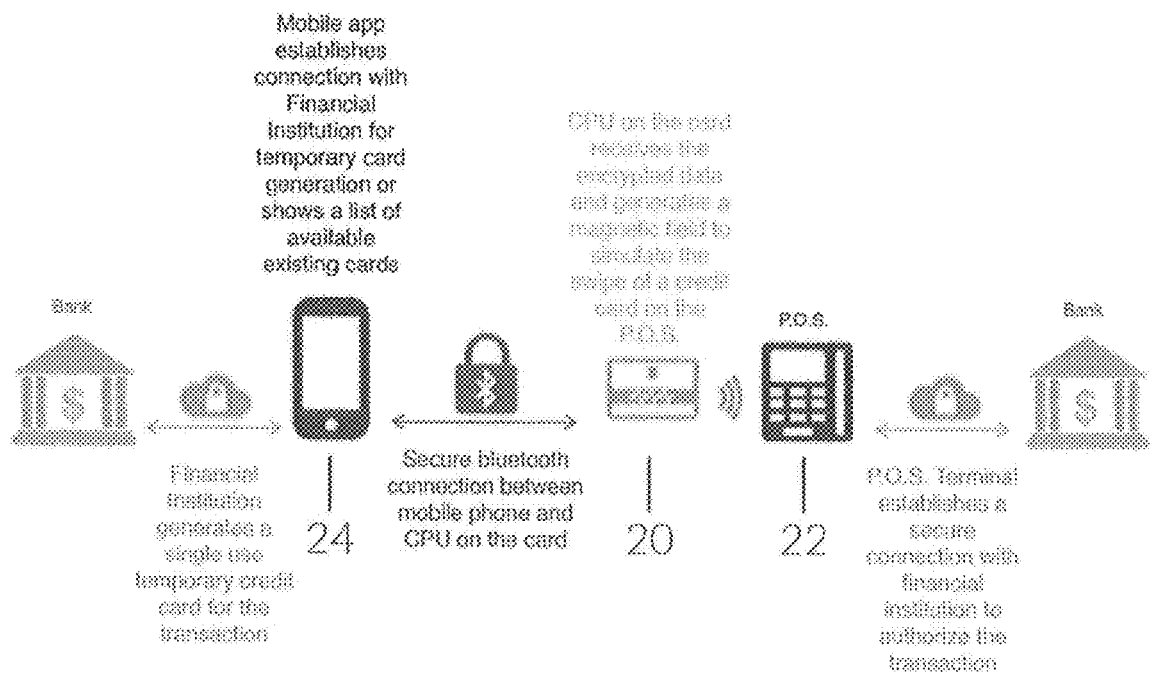
FIG. 3 schematically illustrates the method of using the enabling card in a P.O.S. terminal to gather credit card information from a mobile device to complete the transaction.

FIG. 3 schematically illustrates the method of using the card 20 in the P.O.S. terminal to gather credit card information from a mobile device 24 such as a phone or the like to complete the transaction.

Figure 4:
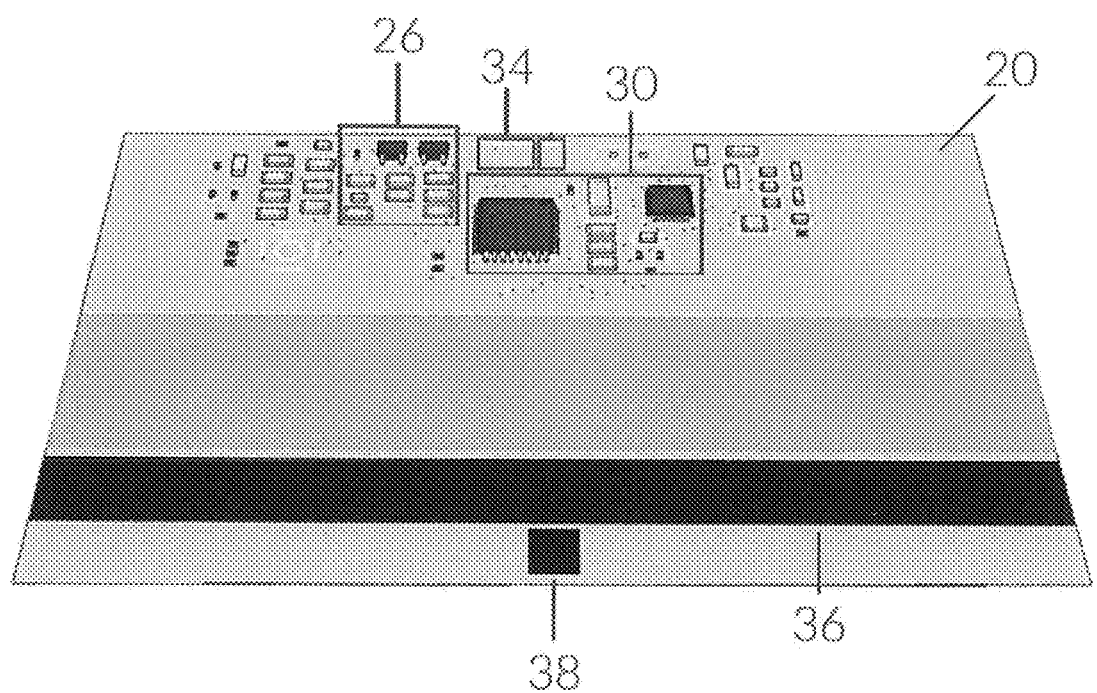
FIG. 4 is a top plan view of one embodiment of the enabling card.

FIG. 4 illustrates one embodiment of the invention which comprises the enabling card 20 having a charger circuit 26. The card 20 also includes a CPU or micro controller 30. Generally speaking the micro controller 30 can communicate by Bluetooth technology, WiFi or the like. The enabling card 20 establishes a secure Bluetooth connection with the mobile device 24.

In one embodiment the CPU communicates by a Bluetooth technology which is generally more secure than WiFi. Generally speaking WiFi technology is easier to intercept than that of Bluetooth. The enabling card 20 also can include a rechargeable battery 32 which can comprise a Li-Po battery or a miniature solar panel which is part of the enabling card 20 that can be charged by the sun or the like.

The enabling card 20 also includes a programmable port 34 and includes a coil 36 which generates a magnetic field to simulate the swipe of a normal financial card. The coil 36 may also include sensor 38 that can used to sense when the enabling card 20 is ready to read.

In one embodiment the enabling card is an electronic device that communicates with a mobile device 24 as described.

Figure 5:
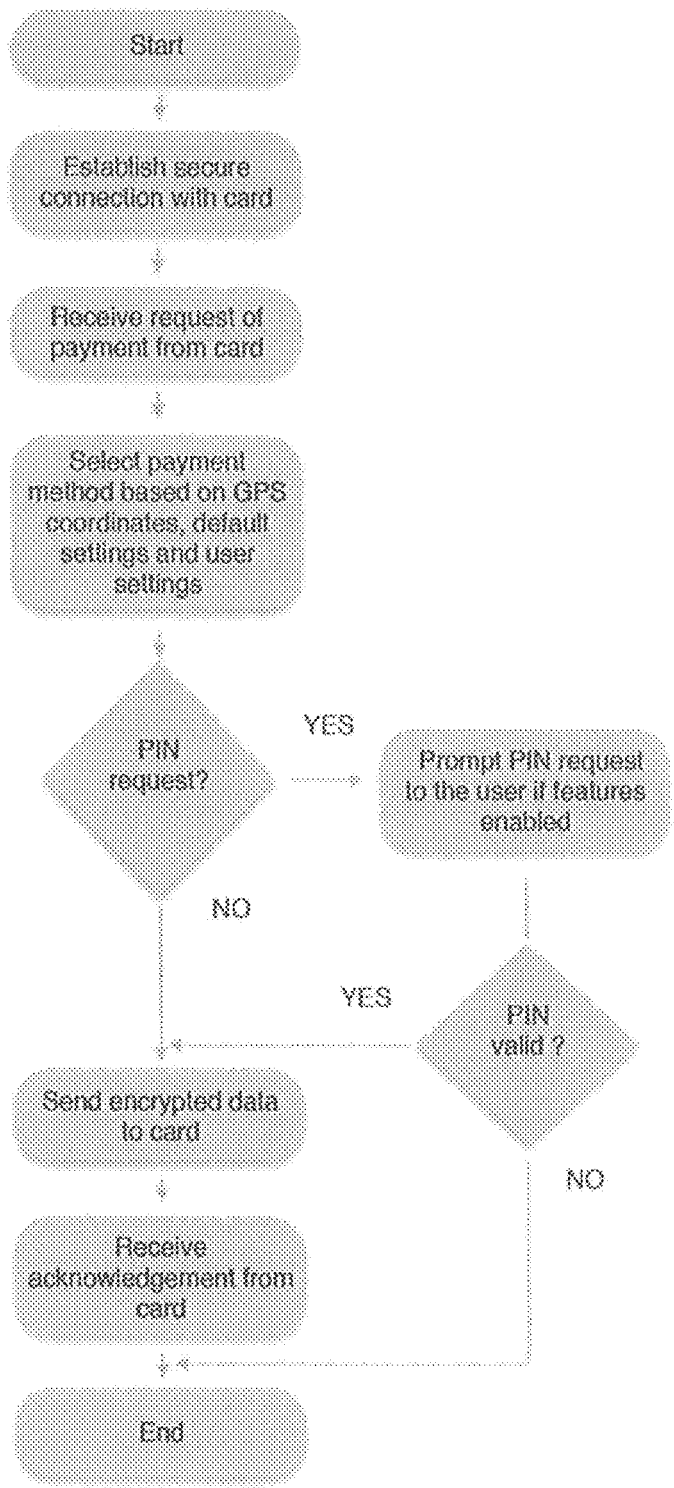
FIG. 5 illustrates a flow chart representing one embodiment of the invention.

FIG. 5 illustrates an operable embodiment of the invention which comprises the steps of establishing a secure connection with the enabling card 20 and then receiving a request for payment for the enabling card 20 through the P.O.S. terminal 22. Thereafter a payment method can be selected based on GPS coordinates, default settings and user settings as shown. There can be a PIN request if the feature is enabled and thereafter encrypted data may be sent to the enabling card 20 by the mobile device 24. Thereafter an acknowledgement can be received from the enabling card 20.

Figure 6:
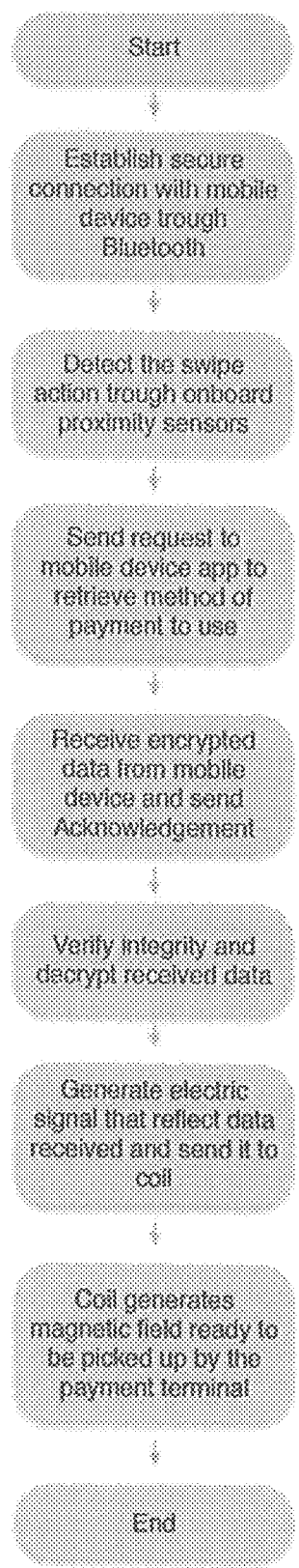
FIG. 6 is another representative drawing of the invention.
Figure 7:
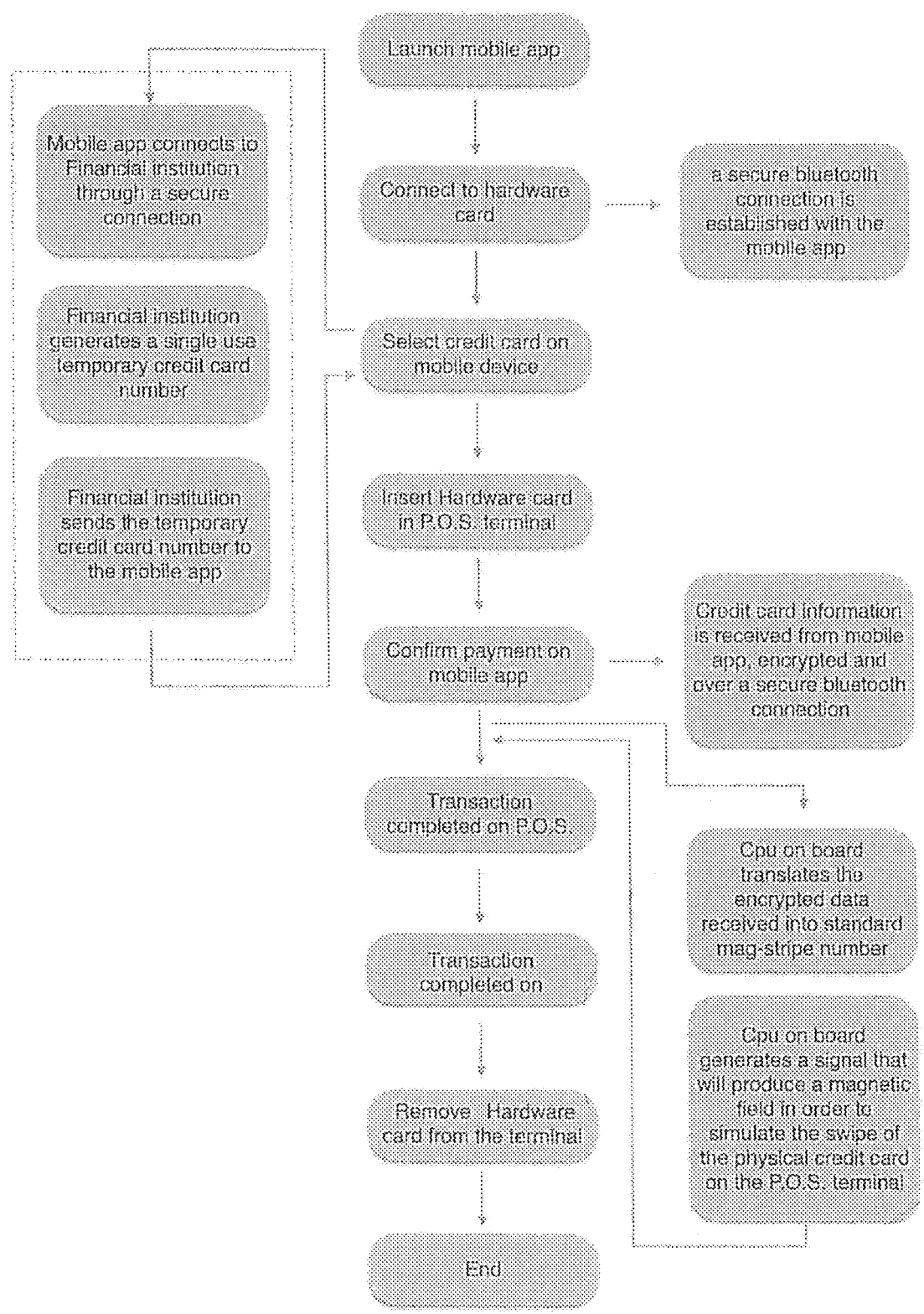
FIG. 7 illustrates a flow chart of the invention.

FIG. 6 also shows the method of establishing a secure connection with the mobile device 24 by means of Bluetooth technology. The swipe action can be detected through on-board proximity sensors 38. A request is sent to the mobile device application 34 to retrieve a method of payment of use. Thereafter encrypted data is received from the mobile device 24 and sent to the enabling card 20. There is a verifying step to verify the integrity and then decrypt the received data. Thereafter an electric signal is generated that reflects the data received and it is sent to the coil 36. The coil 36 generates a magnetic field ready to be picked up by the P.O.S. terminal to complete the transaction.

The mobile device 24 has an app which stores the encrypted information or makes it possible to receive one time encrypted information for either a single enabling card or a plurality of credit card authorization information and the user can select the credit card that is desired for the transaction. Once selected the card information can be securely sent to the enabling card 20. The enabling card 20 is a dumb card or a blank card until it communicates with the mobile device 24.

The invention described herein has the following attributes:

1. Card security improvement. The card does not hold/carry any personal and/or financial information of its owner. A lost or stolen can be easily replaced without any security concern.
2. Total retro-compatibility. The card is compatible with any reading device such as a P.O.S. payment terminal already in use and does not require any software/hardware upgrade in order to work.
3. Update-able. The front of the card can be periodically updated by the financial institute/issuer of the card. This technology can be used to deliver notifications, bar-codes, QR-codes etc. Once modified, the front of the card will maintain its appearance until the next update will be processed, even if the battery is unplugged or totally discharged (power consumption is very minimal).
4. Enormous increment of transactional security. The validation by PIN, or other type of recognition can be processed on the mobile device 24. This new procedure/behaviour will minimize the possibility of PIN involuntary disclosure and be substantially immune to skimmer/'man in the middle type of attacks; it will also shift the responsibility for 'un-authorized transactions.
5. The already 'armoured' transaction security can also be further improved, by the delivery of unique and 'one time only' credit card numbers for each different transaction.

Figure 8:
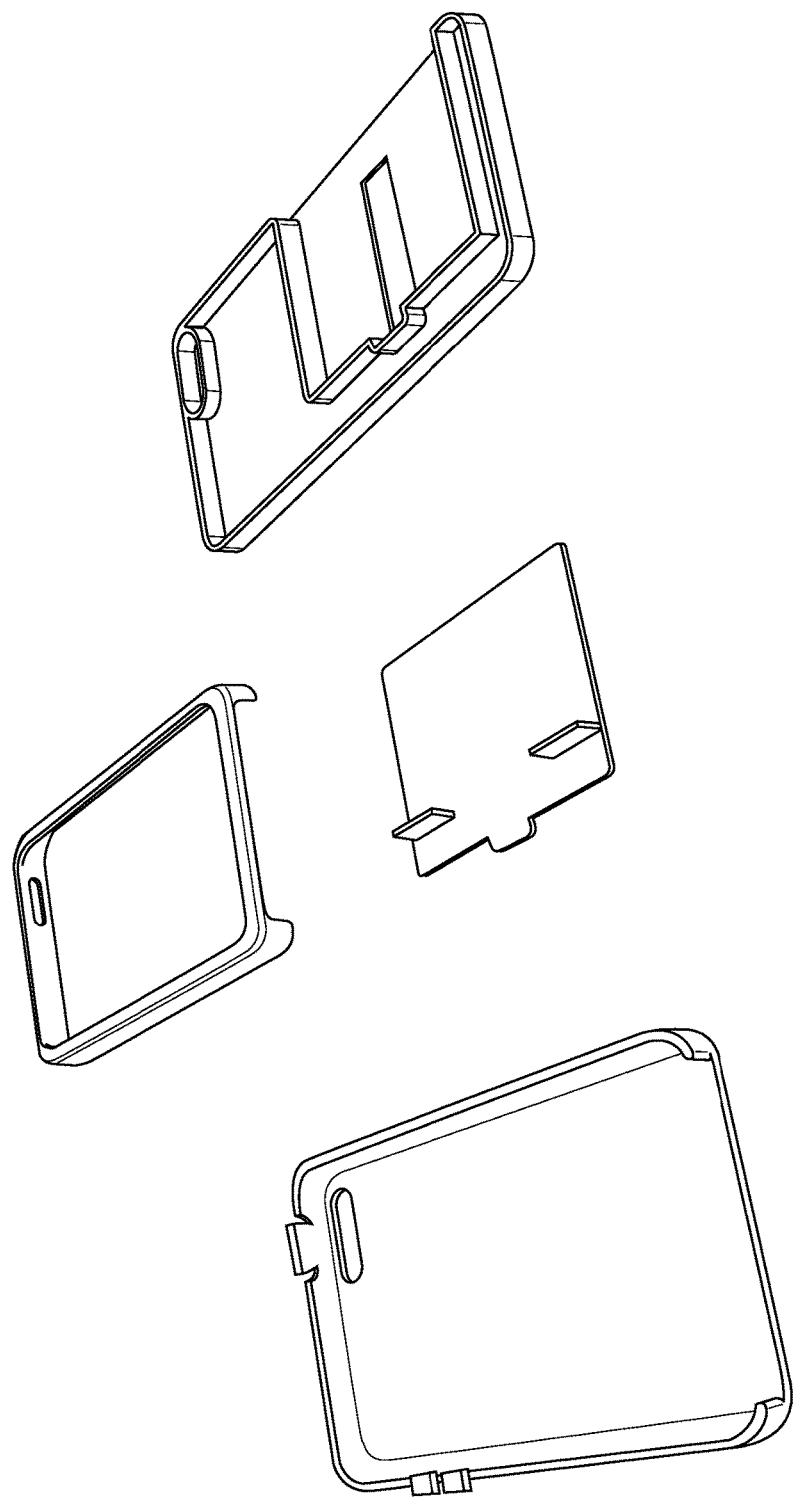
FIG. 8 illustrates another embodiment of the invention whereby the enabling card is within a phone case.

FIG. 8 illustrates yet another embodiment of the invention where the enabling card 20 is within a phone case 50. More specifically the enabling card 20 is slideably within compartment 52. The method will be the same as previously described except that the enabling card 20 will slide out to one side and the user will swipe the phone as for example in an iphone, where the swiping will activate the app and the "PIN" will display on the user's phone.

Although the invention has been described in relation to credit cards it can also be used for NFC, EMV and barcode. Furthermore E-paper controller technology can be used to also periodically visually update the financial institution card with promotional options, logo updates, marketing tools, and notification deliveries.

What is claimed is:

1. An enabling card for completing a transaction in a reader comprising:
    a) a processor carried by the enabling card to:
        i) establish a connection with a mobile device; and
        ii) receive secure information from the mobile device to generate a digital signal to a means carried by the enabling card;
    wherein said means carried by the enabling card receives said digital signal from said processor to generate a magnetic field to simulate the swipe of a regular credit card in the reader and complete the transaction.

2. The enabling card as claimed in claim 1 wherein the mobile device comprises a mobile phone and the processor establishes a wireless connection with the mobile phone.

3. The enabling card as claimed in claim 2 wherein the transaction comprises a financial transaction and the mobile phone includes an application for capturing secure information to complete the transaction.

4. The enabling card as claimed in claim 3 wherein the secure information comprises encrypted information or authorization that normally resides in a financial card or obtaining a one time encrypted authorization from a financial institution.

5. The enabling card as claimed in claim 4 wherein the means for generating a magnetic field comprises a coil for generating a magnetic field when said coil receives said digital signal directly from said processor.

6. The enabling card as claimed in claim 5 further including a power source.

7. The enabling card as claimed in claim 6 wherein the power source comprises a Li-Po battery.

8. An enabling card as claimed in claim 5 wherein there is no further processing of said digital signal from said processor to said coil.

9. The enabling card as claimed in claim 2 wherein the financial transaction comprises a financial transaction card.

10. An enabling card as claimed in claim 1 including means carried by the enabling card to lose the secure information after completion of the transaction.

11. A method as claimed in claim 10 wherein the enabling card loses the one time encrypted authorization after the transaction.

12. A system for completing a financial transaction through a P.O.S. terminal comprising:
    a) a mobile phone having an app for containing encrypted credit card authorization information;
    b) an enabling card comprising:
        a CPU; and
        a wireless communication module for establishing a connection with the mobile phone app; and
        a coil
        so as to receive the encrypted credit card authorization information;
    c) wherein the CPU translates the encrypted credit card authorization information and generates a digital signal, which digital signal is received by the coil to generate a magnetic field to simulate the swipe of a regular credit card in the P.O.S terminal and complete the transaction.

13. A system as claimed in claim 12 wherein the CPU translates the encrypted credit card authorization information; into a standard track 2 ABA number.

14. A system as claimed in claim 13 the mobile phone app contains a plurality of encrypted credit card authorization information relating to a plurality of credit cards.

15. A system as claimed in claim 14 wherein the enabling card comprises a USB serial interface to charge and program the enabling card.

16. A system as claimed in claim 15 further including a micro-controller for EMV and NFC interface.

17. A system as claimed in claim 16 wherein the CPU comprises a micro-controller/RAM for firmware storage and processing.

18. A system as claimed in claim 17 wherein the enabling card includes a programming port to download and update firmware to the financial transaction card.

19. A system as claimed in claim 12 wherein the CPU loses the encrypted credit card authorization information after completion of the transaction.

20. A method of completing a financial transaction in a P.O.S. terminal comprising the steps of:
   a) inserting an enabling card into the P.O.S terminal, the enabling card lacking authorization information;
   b) generating encrypted digital credit card authorization information by a financial institution received by a mobile phone application;
   c) establishing a wireless connection between the enabling card and the mobile phone application containing encrypted digital credit card authorization information;
   d) transferring the digital credit card authorization information from the mobile phone to the enabling card;
   e) generating a digital magnetic field in response to the digital credit card authorization information transferred to the enabling card:
so as to complete the transaction.

21. A method as claimed in claim 20 wherein the enabling card loses the digital credit card authorization information after the transaction.

22. A method as claimed in claim 20 wherein the mobile phone application contains a plurality of encrypted credit card authorization information corresponding to a plurality of cards, and includes validation by PIN or other type of recognition operable on the mobile phone.

23. A method of completing a financial transaction in a P.O.S. terminal comprising the steps of:
   a) establishing a connection between a mobile phone application and a financial institution to receive a one time encrypted authorization from the financial institution;
   b) inserting an enabling card into the P.O.S terminal, the enabling card lacking authorization information;
   c) establishing a wireless connection between the enabling card and the mobile phone application containing said one time encrypted authorization;
   d) transferring the one time encrypted authorization from the mobile phone to the enabling card;
   e) generating a magnetic field in response to the one time encrypted authorization transferred to the enabling card;
   e) the enabling card losing the one time encrypted authorization at the completion of the transaction.

* * * * *